US007756822B2

(12) United States Patent
Danner et al.

(10) Patent No.: US 7,756,822 B2
(45) Date of Patent: Jul. 13, 2010

(54) OPERATIONAL REPORTING ARCHITECTURE

(75) Inventors: Gerd Danner, Schriesheim (DE); Andreas Wesselmann, Schweitzingen (DE)

(73) Assignee: SAP AG, Walldorf (DE)

( * ) Notice: Subject to any disclaimer, the term of this patent is extended or adjusted under 35 U.S.C. 154(b) by 523 days.

(21) Appl. No.: 10/726,004

(22) Filed: Dec. 1, 2003

(65) Prior Publication Data

US 2005/0120051 A1 Jun. 2, 2005

(51) Int. Cl.
G06F 7/00 (2006.01)
G06F 17/00 (2006.01)
(52) U.S. Cl. .................. 707/602; 707/600; 707/601; 707/603
(58) Field of Classification Search .............. 707/1, 707/4, 101, 102, 2, 3, 5, 6; 345/419; 717/106
See application file for complete search history.

(56) References Cited

U.S. PATENT DOCUMENTS

| 5,940,822 | A  | * | 8/1999  | Haderle et al. .............. 707/3 |
| 6,581,054 | B1 | * | 6/2003  | Bogrett ....................... 707/4 |
| 6,604,110 | B1 | * | 8/2003  | Savage et al. ............. 707/102 |
| 6,847,973 | B2 | * | 1/2005  | Griffin et al. ............. 707/101 |
| 6,996,800 | B2 | * | 2/2006  | Lucassen et al. .......... 717/106 |
| 7,003,517 | B1 | * | 2/2006  | Seibel et al. ................ 707/6 |
| 2003/0135827 | A1 |   | 7/2003  | Kanzler et al. ............ 715/522 |
| 2003/0208460 | A1 | * | 11/2003 | Srikant et al. ................ 707/1 |
| 2004/0207621 | A1 | * | 10/2004 | Allor ........................ 345/419 |
| 2005/0120021 | A1 | * | 6/2005  | Tang et al. ................. 707/10 |

FOREIGN PATENT DOCUMENTS

EP   1118948 A2   7/2001

OTHER PUBLICATIONS

Davidson et al., "K2/Kleisli and GUS: Experiments in Integrated Access to Genomic Data Sources", IBM Systems Journal, vol. 40 No. 2, 2001, pp. 512-531.
Chaudhuri et al., "An Overview of Data Warehousing and OLAP Technology", SIGMOD Record, vol. 26, No. 1, Mar. 1997 pp. 65-74.
Todd Walter, "Ask the Expert T2T", Teradata Magazine,http://www.teradata.com/t/page/115862/index.html, retrieved from the internet: on Aug. 21, 2006, pp. 1-3.
Data warehouse, SearchSQLServer.com Definitions, http:/searchsqlserver.techtarget.com/sDefinition/0,290660. sid87_gci211904,00.html, retrieved from the internet:on Aug. 21, 2006, pp. 1-3.

(Continued)

Primary Examiner—Apu M Mofiz
Assistant Examiner—Susan Y Chen
(74) Attorney, Agent, or Firm—Mintz, Levin, Cohn, Ferris, Glovsky and Popeo, P.C.

(57) ABSTRACT

An architecture and system for integrating online transactional processing (OLTP) systems with online analytical processing (OLAP) system. The architecture includes a data access layer having one or more data access programs for accessing OLTP data, a service layer having a business intelligence (BI) platform for generating OLAP data, and a data abstraction layer providing a common meta-model for OLTP data integrated with OLAP data. The architecture further includes a user interface presentation layer configured to provide a user interface for displaying a report run on the integrated OLTP and OLAP data.

22 Claims, 3 Drawing Sheets

OTHER PUBLICATIONS

Exforsys Inc., "Tutorial 2: Data Warehouse database and OLTP database" http://www.exforsys.com/content/view/1295/332, retrieved from the internet: on Aug. 22, 2006, pp. 1-4.

Michael Jennings et al., "Ask the Experts", DMReview.com, Nov. 5, 2002.

"OMG Common Warehouse Metadata Interchange (CWMI) Specification," http://xml.coverpages.org/omg-cwmi.html, May 9, 2001.

Oracle Warehouse Builder: A Technical Overview, An Oracle Technical White Paper, Feb. 2000.

Certified English translated abstract of "Datenintegration und Mediatoren", from Web & Datenbaken, by Kai-Uwe Sattler et al., 2002.

* cited by examiner

OPERATIONAL REPORTING ARCHITECTURE

BACKGROUND

Within recent years, data warehouse systems and business intelligence (BI) tools have established importance for supporting strategic business decisions. In a typical data warehouse system, a large amount of data is assembled periodically in a warehouse server, and then transformed or "cleansed" before it is generated and stored in a special data structure called a multidimensional database. These data structures can be stored on the same or another warehouse server that will be used for multi-dimensional analysis and reporting.

Inherent in conventional data warehouse architectures, and also one of the biggest challenges to effective BI processing, is a substantial time lag between when data is being generated and when data is available for reporting. Thus, as BI tools and data warehouse systems are increasingly employed for business strategy, there is ever more effort, albeit unsuccessful as yet, toward diminishing the data access latency to as close to zero as possible. Ideally, data would be reported immediately as it is being generated.

SUMMARY

This document discloses architectures and methods that help satisfy a business need for reporting data at substantially the same time it is generated. The described architectures and methods are able to integrate data from different online transactional processing (OLTP) systems and online analytical processing (OLAP) systems into a single BI tool and platform. One architecture includes a semantic layer that is configured to provide abstraction of a data source. This semantic layer allows using a uniform user interface (UI) tools for designing and running reports, no matter where data is actually located. The semantic layer also integrates data coming directly from OLTP systems with data being stored within the BI platform. The latter is particularly beneficial, since a typical BI platform does not contain current data, and a conventional OLTP system does not contain data history.

The described operational reporting architecture supports different levels of integration. Depending on volume of data to be reported, the data access performance in the OLTP system, and the reporting scenario that defines the level of analytical functionality needed in the reporting system, a user can choose between three different approaches of integrating data into the BI platform. Furthermore, the architecture provides scalability between these different levels of integration. If a user decides at some point to use another way of integrating data into the BI platform, the architecture is configured to allow the user to easily switch from the current level of integration to another.

Additionally, the operational reporting architecture extends the master data, external hierarchy and authorization concepts of conventional BI systems beyond Business Warehouse (BW) boundaries. Accordingly, within this architecture it is possible to use master data, authorization data, and hierarchies that are stored in operational systems directly for reporting with BI tools.

In accordance with one embodiment, an architecture for integrating OLTP systems with an OLAP system includes a data access layer having one or more data access programs for accessing OLTP data, a service layer having a BI platform for generating OLAP data, and a data abstraction layer providing a common meta-model for OLTP data integrated with OLAP data. The architecture further includes a user interface presentation layer configured to provide a user interface for displaying a report run on the integrated OLTP and OLAP data.

In accordance with another embodiment, a system for operational reporting of multidimensional analysis of business data sources includes one or more data sources providing OLTP data, a BI platform having a multidimensional database providing OLAP data, and a data abstraction layer having a unified view module configured to integrate the OLTP data with the multidimensional database to produce a common meta model data set. The system can further include a UI tool set for creating a unified UI for displaying reports that are run on the multidimensional database and the common metal model data set.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
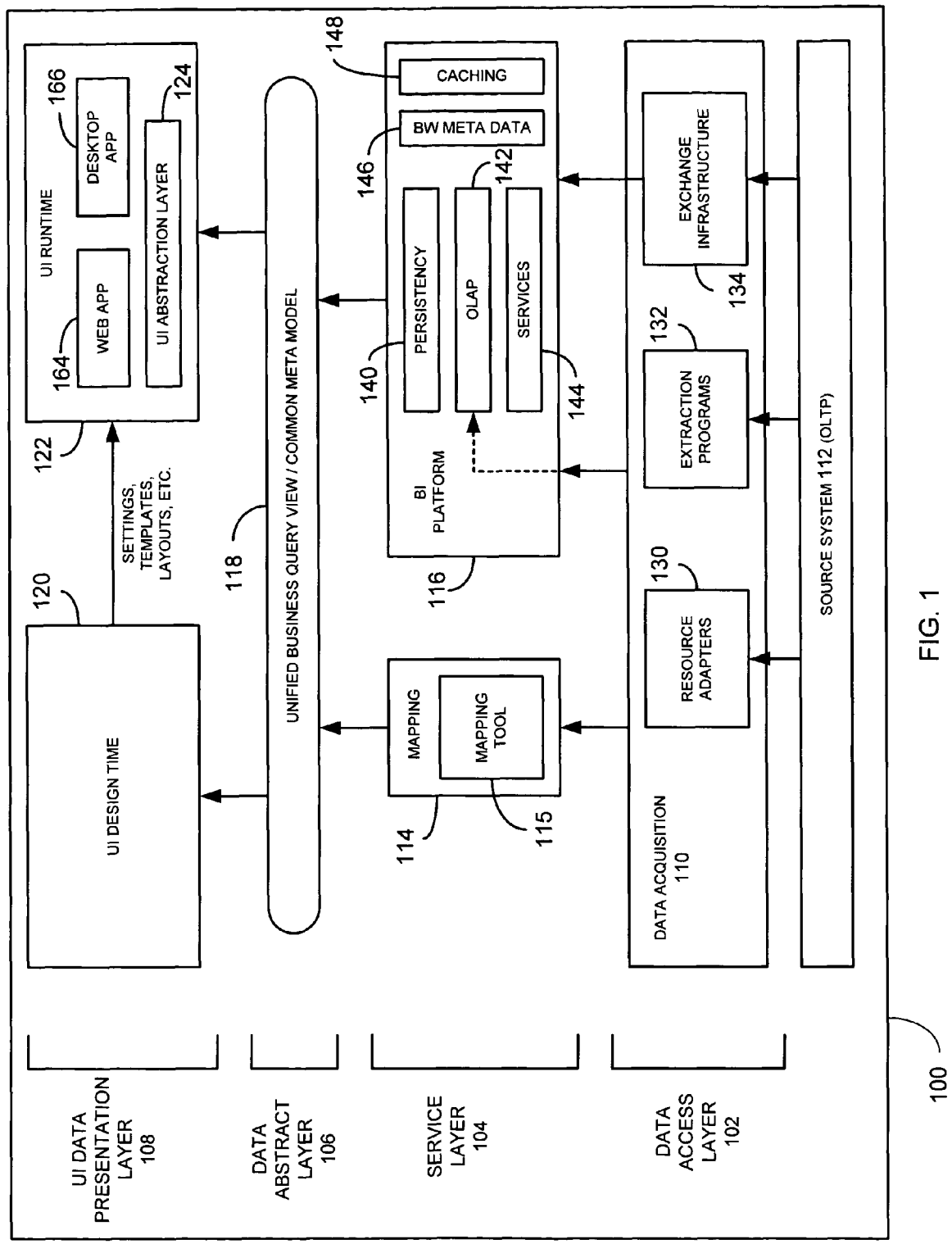
FIG. 1 is a block diagram of an operational reporting architecture.

FIG. 1 illustrates an operational reporting architecture 100 generally having a data access layer 102, a service layer 104, a data abstraction layer 106, and a user interface (UI) layer 108. The data access layer 102 includes one or more data acquisition modules 110 for accessing data from heterogeneous source systems 112. Data is mapped into a well-defined interface, and complexities such as where data is stored and how it can be accessed are hidden from the subsequent layers.

Following the data access layer 102, the service layer 104 provides further data enrichment functions such as mapping services 114, and includes a BI platform 116. The BI platform 116 provides persistency 140, OLAP engine 142, generic BI services 144, and BW metadata 146. The OLAP engine 142 includes an OLAP server and related OLAP functions and services. Data passed from the service layer 104 to the data abstraction layer 106 is transformed into a common meta data model for a unified business query view 118.

One task of the data abstraction layer 106 is to hide data source- and integration path-dependent information from the UI data presentation layer 108. The data abstraction layer provides a common metadata model and common result set model into which the various data sources are mapped. The meta data model describes the structure of data and the services that are offered by a specific source, e.g. aggregation, sorting, filtering, etc. By transforming data from different data sources into one metadata model, it is possible to relate one set of data to another. The common result set model ensures that data from all data sources is provided to components of a UI runtime module 122 in the same manner.

Data flow from the source systems 112 through the data access 102, service 104 and abstraction 106 layers can follow different paths, called "integration paths." Each integration path provides a unique service quality. Integration paths and their respective service qualities are described in further detail below.

On top of the data abstraction layer 106 is the UI data presentation layer 108. The UI data presentation layer includes a UI design time module 120 and the UI runtime module 122. The UI design time module 120 uses the metadata model provided by the data abstraction layer 106 and allows building reports on that common model. The UI runtime module 122 gets data and service quality descriptions from the data abstraction layer 106 and layout information from the UI design time module 120. A UI abstraction layer 124 within the UI runtime module 122 provides a common command and layout description interface for both web- and desktop-based UI presentations.

These four layers are described in further detail below.

Data Access Layer 102

Operational reporting in an open system environment must be able to access data from all different kinds of sources. The operational reporting architecture 100 is able to integrate data from both OLTP systems and OLAP systems into one single BI tool and platform suite. Further, the operational reporting architecture 100 can integrate document-like data sources like Office documents (e.g. MICROSOFT OFFICE, STAR OFFICE) as well as eXtensible Markup Language (XML) documents, among others.

The data access layer 102 provides functionality to access data from heterogeneous sources. Data access is handled by one or more resource adapters 130, special extraction programs 132, or an exchange infrastructure 134. The data access layer 102 hides information about where data is stored and how data can be accessed by subsequent layer(s).

Resource Adapters

Each resource adapter 130 is a system-level software driver that is used to connect to data sources such as database systems, enterprise resource planning (ERP) systems, and Web services. The resource adapter 130 allows integration of data from various OLTP data sources into the operational reporting architecture 100. Resource adapters 130 can be provided for various data sources, including but not limited to, ACTIVEX DATA OBJECTS (ADO) and ADO Multi-dimensional (ADO MD), JAVA DATABASE CONNECTIVITY- (JDBC), EXTENSIBLE MARKUP LANGUAGE FOR ANALYSIS (XMLA) and SAP (SYSTEME, ANWENDUNGEN UND PRODUKTE IN DER DATENVERARBEITUNG) QUERY. These data sources comprise relational sources and multi-dimensional sources. Resource adapters 130 hide the complex details about where data is stored and how heterogeneous data sources can be accessed, e.g. in accordance with their respective query language (MDX (Multidimensional Expressions), SQL (Structured Query Language), etc.). The resource adapters 130 are fully extensible, i.e. future resource adapters 130 can include drivers for native database systems, open and proprietary document formats (e.g. XML or office documents like MICROSOFT EXCEL), etc.

Extraction Program

Each extraction program 132 is a piece of software that is invoked through the data access layer 102 to read data from any data source 112. Extraction programs 132 can be implemented in any programming language, but should adhere to a well-defined interface. The extraction programs 132 can be invoked through a special software component in the data access layer 102. In operation, an extraction program 132 receives selection criteria through the interface, selects data from any source 112 according to the selection criteria, and delivers the selected data again through the interface. Data transfer logic can be handled generically by the access layer 102 and need not be built into the extraction program 132. Extraction programs 132 can be delivered along with business content, however customers may define their own extraction programs 132.

Exchange Infrastructure

The XI (exchange infrastructure) 134 is a platform for process integration based on the exchange of standard messages, such as XML, according to predefined business process scenarios. The XI 134 provides a technical infrastructure for message-based exchange in order to connect proprietary and third party components with each other. In one embodiment of the XI 134, data is exchanged between application systems in the form of XML messages. Other message types can also be used. For example, applications can send messages in their native format. The XI 134 performs XML mapping to transform a native format message into an XML message for outbound delivery to a receiving application, either as an XML message or mapped back to the receiving application's native message format.

Within the operational reporting architecture 100, the XI 134 can be used to connect internal and external data sources into the BI platform 116. Process-oriented data exchanged between software components using the XI 134 as an enterprise application integration (EAI) tool automatically gets propagated into an inbound queue (not shown) of the BI platform 116. From there, real-time data integration processes store data in the reporting persistency 140 of the BI platform 116.

Service Layer

Following the data access layer 102, the service layer 104 provides further data enrichment functionality, from simple mapping into a common meta model to adding services from the BI platform 116. As the data is transferred from the service layer 104 to the data abstraction layer 106, the data gets transformed into a common meta model.

Mapping Service

The minimal transformation that has to be performed by the service layer 104 is to map a data source's proprietary data model into the common meta model of the data abstraction layer 106. This mapping 114 can be done automatically or manually within the service layer 104. In the first case, the properties of the data source's fields are examined and mapped into the meta model using simple rules, e.g. "treat all numeric fields as facts and non-numeric fields as dimensions," or "use summarizing as default aggregation behavior of facts," etc. In case of manual mapping, a special mapping tool 115 creates the mapping from the data source's fields to the abstraction layer's meta model. During this mapping process the user must manually describe the properties for each field, e.g. whether they are facts or dimensions and in case of facts what aggregation behavior they have, etc.

The service layer 104 uses the BI platform 116 to offer additional service qualities, like a persistency layer 140 to store data in structures that are optimized for reporting, OLAP analysis functionality from the OLAP engine 142 or generic BI services 144, e.g. planning, etc. One integration path may use some of these services whereas another integration path may use all of these services, e.g. remote BI platform integration and real-time data acquisition both integrate data into the BI platform 116. Integration paths may differ in whether they use the BI platform's persistency layer 140, but may commonly use all other services of the BI platform 116.

The persistency layer 140 of the BI platform 116 stores data in data structures that are highly de-normalized and optimized for reporting purposes. These data structures provide a single point of access for reporting, in contrast to operational systems where reporting data usually is spread over several tables that have to be joined with expensive database operations. The OLAP engine 142 provides a complete set of analytical functionality including filtering, drill-down, currency awareness, currency translation, aggregation, formulas, complex selections, external and data-driven hierarchies, etc. Both remote BI platform integration and real-time data acquisition use the OLAP engine 142.

In addition to OLAP analysis, the BI platform 116 offers generic BI services 144. These include caching, report-to-report interface for drill-through, report dissemination services, document integration, planning, data entry and write-back. Furthermore, for operational reporting the BI platform's master data and external hierarchy can be extended. To assure high performance of the operational reporting architecture 100, an efficient caching is essential. The BI platform provides a caching layer 148 on a per-report basis. The caching layer 148 can handle navigation steps within the report. This caching layer 148 supports both remote BI platform integration and real-time data acquisition. Drill-through (i.e. jumping from one report to another report), an operational transaction or a web service including transferring the current context like selections and filters are also handled by the BI platform 116. Report dissemination services provide a foundation for pre-calculation and automatic distribution of reports using various document formats and distribution channels, e.g. e-mail, publishing to knowledge management platforms, etc. Document integration can either be used to link documents to meta data objects, like queries or multidimensional data structures such as INFOCUBES, or to link documents to characteristic values, such as specific customers, and to transaction data. The planning, data entry, and write-back functionalities provided by the platform allows for creation of closed-loop scenarios within the architecture.

In conventional BI platforms, master data and hierarchy data are stored persistency tables within the BI platform. This data can be shared between different reporting objects, e.g. INFOCUBES and operational data store (ODS) objects, to form a common basis for reporting. For operational reporting, especially when remotely integrating data into the BI platform 116, replicating master data and hierarchies before reports are run is not acceptable. Hence, in the operational reporting architecture 100 master data services and hierarchy services are extended to support remote access of master data and hierarchy data in the respective source system. The basic functionality of sharing master data and hierarchies between reporting objects to form a common basis for reporting is also done with remote access.

The persistency 140, OLAP engine 142 and BI services 144 of the BI platform 116 are linked through the metadata layer 146. The metadata layer 146 describes all objects within the platform, from facts and characteristics, such as shared dimensions, to reporting objects like INFOCUBES or ODS objects. Export and import facilities enable an open meta data exchange with other systems in the operational reporting architecture 100 and with the data abstraction layer 106.

Data Abstraction Layer

The data abstraction layer 106 hides the complexity of data acquisition from the UI design time 120 and the UI runtime 122. The data abstraction layer 106 provides meta data to the UI design time 120 for report design, and provides data to the UI runtime 122 for report execution. Hence, the source of data is transparent to both the UI design time 120 and runtime 122. The data abstraction layer 106 also provides a description of the meta data model and the result set of the data, interfaces to retrieve and interact with data, and a description what functionality is available with the respective data source, e.g. analytical capabilities, data entry, etc.

Using the data abstraction layer 106 it is possible to map data sources from all different kinds of source systems and data sources from the BI platform into one common meta model, called the unified business query view 118. To achieve this the data abstraction layer 106 exchanges meta data information with the BI platform 116. Through mapping routine into a common model, the data abstraction layer 106 allows for real-time integration of data coming from OLTP systems 112, one or more various OLAP systems such as OLAP engine 142, and the BI platform 116. OLTP systems 112 typically contain fine, granular and up-to-date data, but typically no data history. Data history is typically kept in the BI platform 116, but as described earlier, data in the BI platform 116 comes with a time lag between data creation and the data's availability for reporting. Hence, a data abstraction layer 106 on top of the data access layer 102 and service layer 104 integrates OLTP with OLAP reporting and leverages the benefits of both.

Furthermore, the data abstraction layer 106 provides data manipulation services that enable interaction on the data independent from, and in addition to, the data manipulation services provided by either the service layer 104 or the data sources 112 themselves. Examples for such data manipulation services are local calculations or simple data aggregation and pivoting services. In addition, exception handling services are provided to ensure data source-independent visualization of data exceptions.

Integration Paths

Figure 2:
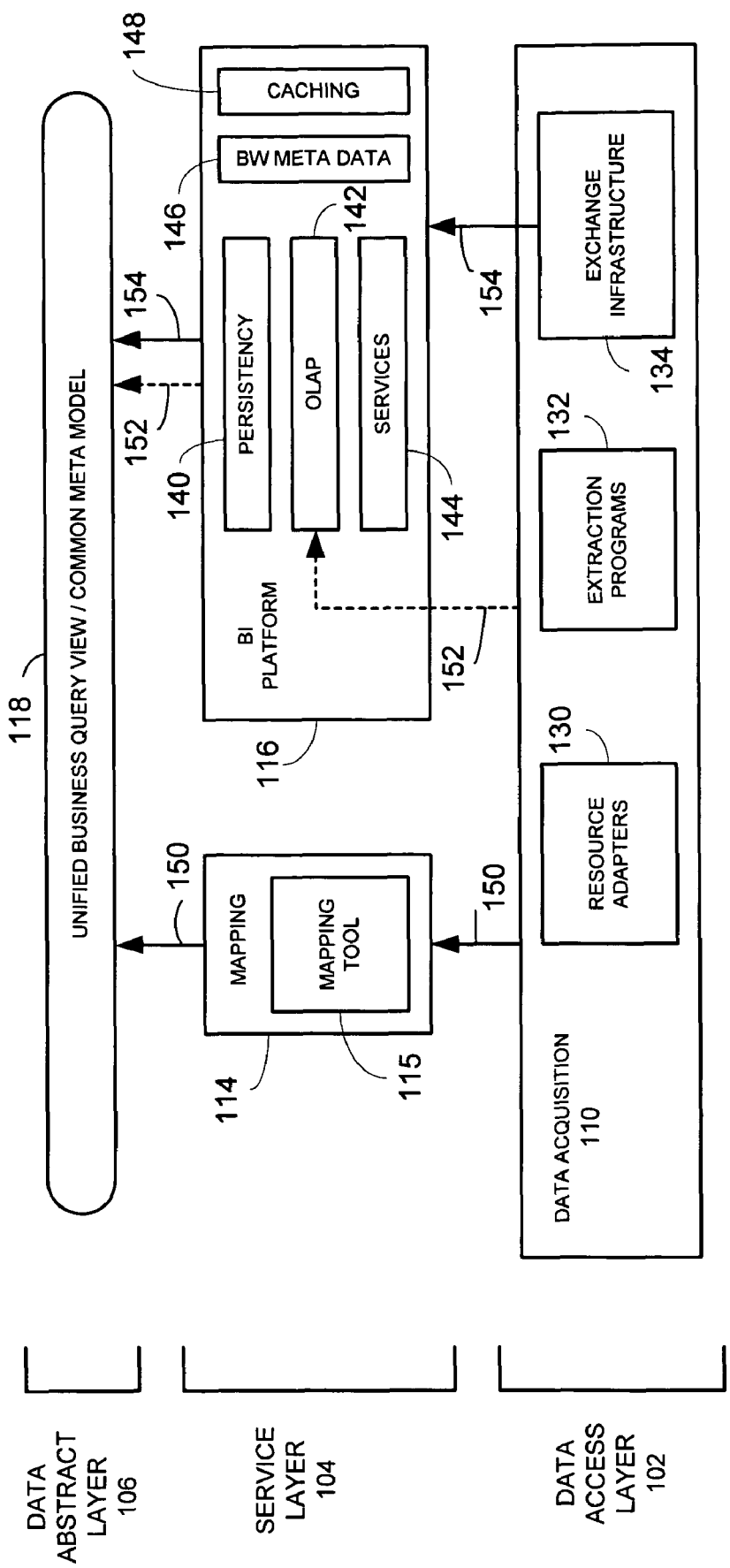
FIG. 2 is a block diagram showing several integration paths of an operational reporting architecture.

With concurrent reference to FIGS. 1 and 2, various integration paths in the operational reporting architecture 100 will be explained. An integration path describes the path from the source system 112 through the data access layer 102 and service layer 104 to the data abstraction layer 106. This path determines the service quality. The different integration paths are shown in FIG. 2, and described in further detail below.

Resource Adapter Direct Mapping

Data provided by resource adapters 130 can be mapped directly into the meta model unified business query view 118 of the data abstraction layer 106. Hence, the resource adapter direct mapping (RADM) integration path 150 allows integration of OLTP data and external OLAP data into the operational reporting architecture without using the OLAP engine 142 or other BI services 144 of the BI platform 116. Hence, data can be used within the operational reporting architecture 100 providing the analytical functionality of its respective data source and without creating the overhead of integrating data into the BI platform 116.

As stated above, a resource adapter (RA) 130 is a system-level software driver that is used to connect to data sources such as database systems, ERP systems, and Web services. There are also special wrapper RAs 130 to encapsulate extraction programs for the RADM integration path 150 as well. The XI 134 is not used for the RADM integration path since the XI 134 can be configured only to deliver individual messages, and usually does not have its own persistency layer. With this approach, data persistency will always be in the source systems 112, i.e. replication into data warehouse structures need not take place. This also means that data can always be available in real-time, with substantially no time delay.

In order to integrate data using the RADM integration path 150, no data modeling in the BI platform 116 is necessary. However, it may be necessary to map the data source's 112 proprietary data model into the common meta model 118 of the data abstraction layer 106. This mapping can be done automatically or manually within the service layer 104, as discussed above.

The level of analytical functionality available for reporting is thus defined by the underlying data source 112. For example, an OLAP source like MICROSOFT ANALYSIS SERVICES provides drill-down, aggregation, etc., whereas a relational source like JDBC provides little to no analytical functionality. There are also data sources 112 that provide write-back functionality, which is particularly important to realize closed-loop scenarios.

Remote BI Platform Integration

Remote BI platform integration operational data can be integrated into the operational reporting architecture 100 with using the BI platform's 116 OLAP engine 142 and generic BI platform services 144 via BI platform (BIP) integration path 152. The BIP integration path 152 adds slightly more overhead compared to the RADM integration path 150, but also offers the analytical capabilities of the OLAP engine 142 and the generic services 144 of the BI platform 116.

There are two ways to access data with the BIP integration path 152. Normally, in case of external third-party source systems 112, resource adapters 130 as described above can be used. In case proprietary or internal source systems 112, special extraction programs 132 provide data to the operational reporting architecture 100. Remote BI platform integration does not use the persistency layer 140 of the BI platform 116. Thus, data persistency is performed in the source system 112, and replication of the data into data warehouse structures need not occur. Accordingly, data is always available in real-time, and with substantially zero latency. Further, if the XI 134 is configured to deliver only individual messages and does not have a persistency layer itself, the BIP integration path 152 does not need to access the XI 134.

To map the data source's data model into the data model of the BI platform 116, an amount of data modeling is necessary, i.e. the mapping of data source fields to InfoObjects in the BI platform 116 should be described. Additional meta data can be automatically generated. In a next step, the data model of the BI platform 116 is automatically mapped into the common meta model 118 of the data abstraction layer 106. This mapping is automatic, and occurs without loosing any information such as aggregation behavior, etc. Since data is integrated into the BI platform 116, the full range of the OLAP engine 142 and the generic BI services 144 of the BI platform 116 are available.

Real Time Data Acquisition

Real-time data acquisition (RTDA) allows integration of operational data into the operational reporting architecture 100 using the OLAP engine 142 and generic BI services 144 of the BI platform 116. The RTDA integration path 154 adds slightly more overhead compared to the remote BIP integration 152. In addition to the analytical capabilities of the OLAP engine 142 and the generic BI services 144 of the BI platform 116, the RTDA integration path 154 stores reporting data in the BI platform's 116 reporting structures. These de-normalized structures are a single point of storage for reporting data, compared to typical operational systems that use many tables to store data, and which have to be joined with expensive database operations. Hence, performance optimization is simplified in the operational reporting architecture 100.

Special extraction programs in the source system 112 post data to a queue data structure at the time that data is being generated. Alternatively, messages exchanged through the XI 134 can be collected in such a queue, which can be located in the inbound layer of the BI platform 116. In the BI platform 116 there is a daemon process that polls data from the queue at periodic time intervals, e.g. once a minute. The daemon then posts data to a persistent staging area in the BI platform 116. The purpose of the staging area is to de-couple the data staging process from subsequent processing in the BI platform 116, i.e. the daemon process just posts data into the staging area and is not involved in further processing in the business warehouse (BW) system. From the staging area, data gets updated in real-time, operational data store (ODS) objects. Accordingly, persistency layer 140 of the BI platform 116 is being used to store data, and therefore data is being replicated. The persistency layer 140 also serves as a source for reporting. The data transfer process creates a small time lag from the time when data is being generated in the operational reporting system until the time it is available for reporting in the BI platform 116.

This RTDA integration path 154 may require data modeling, and the real-time ODS object structure may have to be defined in the operational reporting architecture 100. Thereafter, the data model of the BI platform 116 can automatically be mapped into the common meta model 118 of the data abstraction layer 106. This mapping is fully automatic without loosing any information like aggregation behavior, etc. Accordingly, since data is integrated into the BI platform 116, the OLAP engine 142 and generic BI services 144 are available.

UI Data Presentation Layer

Figure 3:
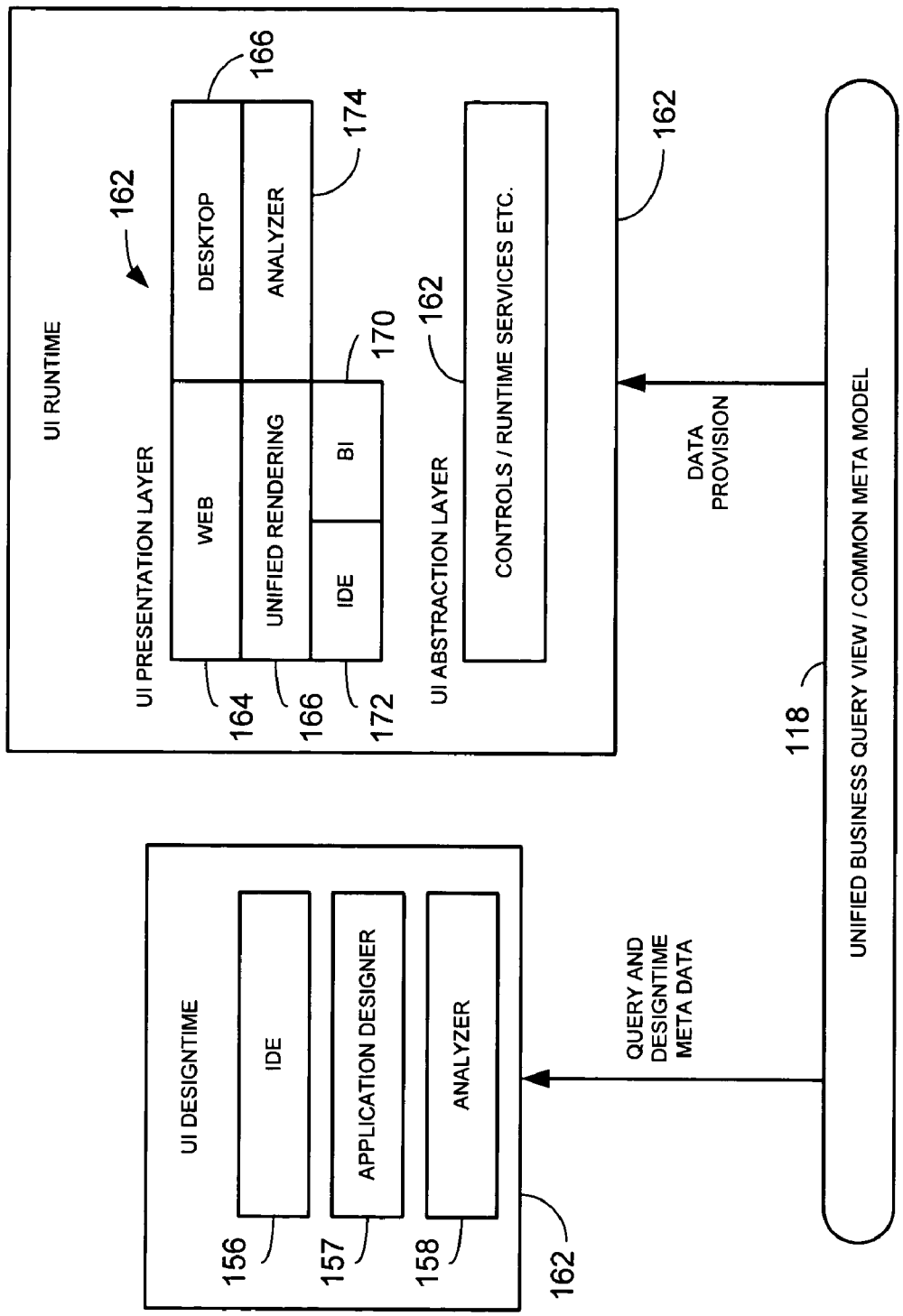
FIG. 3 is a block diagram of a unified query view and user interface presentation layer of an operational reporting architecture.

As illustrated in FIG. 3, the UI data presentation layer 108 includes two user interface components: the UI design time 120 and the UI runtime 122. The UI design time 120 includes several tools to support various UI development scenarios.

Using an integrated development environment (IDE) tool 156, such as WEB DYNPRO IDE developed by SAP, with integrated BI-specific design components of the BI platform 116, (e.g. for report design) a user can design a web-based operational reporting application for receiving most information from the source systems 112, yet at the same time leverages the capabilities of the BI platform 116. Design patterns of the application can be limited to ensure that all business applications have exactly the same look and feel.

In order to design a full page web-based BI control panel for operational reporting, sometimes referred to as dashboard or cockpit, a web application designer (WAD) tool 157 can be used. Once such WAD 157 tool is the BEX WEB APPLICATION DESIGNER developed by SAP, where a highly customizable and target group-specific UI can be designed. With a BI-specific Web API, the WAD tool 157 offers a great amount of flexibility. Yet another tool that can be used to design an application and UI as part of the UI design time 120 is an analyzer tool 158. One such analyzer tool 158 product is the BEX ANALYZER, also developed by SAP. With a close integration into commercial off-the-shelf software products such as MICROSOFT EXCEL, the analyzer tool 158 can leverage all UI presentation capabilities provided by commercial software products. Further, the analyzer tool 158 allows a user to design a desktop application for operational reporting. As all three design tools get their query and design time meta data via the data abstraction layer 106, they all benefit from the advantages mentioned above.

The UI runtime 122 includes a UI abstraction layer 160 and a UI presentation layer 162. The UI abstraction layer 160 ensures that the BI-specific UI components (e.g. reporting & analysis grids, charts & maps)—in a web page 164 (such as might be displayed in an enterprise portal, etc., which is not shown) as well as on a desktop 166—are based on the same BI UI runtime 122 services. These services should be optimized for BI requirements and allow a close integration of reporting, analysis and planning scenarios.

The UI abstraction layer 160 offers the capabilities to integrate and reuse BI UI components, via one of the UI development tools mentioned above, for example. Several integration scenarios are possible. In a "loosely coupled" scenario, all or most of the BI UI components are reused. In a "closely coupled" scenario, additional integration work would be required.

From an end-user perspective there should no difference concerning the UI presentation and interaction capabilities. As shown by example in FIG. 3, the UI is harmonized in the UI Presentation Layer 162 for all web based operational reporting applications. A BI 170 web application, alone or in combination with a IDE 172 web application, use unified rendering services 168 to generate device-specific HTML (HyperText Markup Language) output for display in the enterprise portal.

The desktop UI 166 based on the analyzer tool can look similar to the web application 164 because of the unified business query view 118 provided by the data abstraction layer 106. Thus, the UI data presentation layer 108 can guarantee an identical look and feel for all web-based applications for operational reporting, and a common look and feel for both web applications 164 and desktop applications 166. This is achieved by the operational reporting architecture 100 that allows maximum reuse for all involved components. Further, once an operational reporting application is available in the enterprise portal cache, the HTML output is directly transferred back to the web browser without the need to make a call to the BW system again, unless the displayed data has changed.

Architecture Services

In addition to the functionality covered by the four layers discussed above, the operational reporting architecture 100 provides services that span over several layers. These are scalability, extensibility, and integration of authorizations. Depending on the data integration path chosen, the operational reporting architecture 100 provides different service qualities as described above. The operational reporting architecture 100 provides full scalability between these levels of integration. A customer might want to start of with displaying data that is fetched by resource adapters and directly mapped into the data abstraction layer 106. If analytical requirements grow, or data volume and performance indicates a need for data integration into the BI platform, the customer can simply switch from one level of integration to another one. All missing meta data, e.g. INFOCUBES, ODS Objects, etc., are generated or converted automatically. Or, in case of more complex transitions from one integration path to another, the user can be guided by user-interactive directions such as "wizards."

Another key service of the architecture is extensibility, meaning that a field extension in a data source can automatically be reflected in the operational reporting architecture 100 throughout all layers. The architecture automatically detects an extension in a data source and adapts its data access 102, service 104, data abstraction 106 and data presentation 108 layers. Manual interaction, however, can still be possible and might also be needed in more complex scenarios. Again, for performing manual tasks the user can be supported by "wizards."

Finally, authorization data that is defined in the different source systems can be reusable within the operational reporting architecture 100. There should be no need to re-define authorizations for operational reporting in the reporting layer. The solution depends on the integration path chosen. With the resource adapter concept, authorizations are automatically checked within the respective source system 112. In case users in the reporting system differ from users in the operational system, a user mapping must be defined. With either remote BI platform integration or real-time data acquisition, authorizations are managed within the BI platform 116. If authorization data is desired from the source system instead of building authorization profiles in the BI platform 116, there can be an option to remotely access authorization data, i.e. by providing a remotely-callable extractor for authorization data only. Again, a user mapping might be applicable, if reporting users differ from users in the operational system.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide the UI described above, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., the application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few embodiments have been described in detail above, other modifications are possible. Portions of this disclosure discuss operation though a portal, but any of a number of access systems and methods may be used for operational reporting of integrated OLAP and OLTP data. Other embodiments may be within the scope of the following claims.

The invention claimed is:

1. A system for operational reporting of multidimensional analysis of business data sources, the system comprising:
    a plurality of computing systems each including at least one programmable processor, each of the programmable processors systems executing one or more computer programs, the programmable processors being coupled to receive data and instructions from, and to transmit data and instructions to, at least one storage system, at least one input device, and at least one output device, the computing systems providing:
    one or more data sources providing OLTP data;
    one or more data acquisition modules to access, in a data access layer, the OLTP data from the one or more data sources;
    a business intelligence (BI) platform having a multidimensional database providing OLAP data, the BI platform being in a service layer;
    a resource adapter direct mapping tool to transform the OLTP data of the data sources not being processed by an OLAP engine or the BI platform to a first data set in accordance with a common meta model of a unified view module, the BI platform being in the service layer;
    the unified view module being part of a data abstraction layer, the unified view module integrating the first data set of the OLTP data with the multidimensional data of the multidimensional database to produce a common meta model data set; and
    a user interface (UI) tool set for creating a unified UI for displaying reports that are run on the multidimensional database and common meta model data set, the unified UI to build reports from the common meta model data set;
    the system including at least first and second data flow integration paths originating at the data sources and passing through the data access layer, the service layer, and the data abstraction layer, the first integration path comprising the OLTP data and the resource adapter direct mapping tool and having a first service quality, and the second integration path comprising the BI platform and having a second service quality being different from the first service quality, the first service qualities being dependent on the services used by the first integration path, the second service qualities being dependent on the services used by the second integration path, and wherein the first and second service qualities are at least different in that the second service quality comprises at least some overhead of the BI platform that is not included in the first service quality, the system further comprising a resource adapter integration path allowing integration of OLTP data and external OLAP data without using the OLAP engine or other services of the BI platform.

2. A system in accordance with claim 1, further comprising a UI runtime module to display the unified UI.

3. A system in accordance with claim 1, further comprising a data acquisition module to acquire the OLTP data from the OLTP data source, and to provide the OLTP data to the multidimensional database or to the unified view module.

4. A system in accordance with claim 1, wherein the BI platform is to execute OLAP analysis on the multidimensional database.

5. A system in accordance with claim 4, wherein the BI platform further includes a communication channel connected to a remote OLAP data source.

6. A system in accordance with claim 3, wherein the data acquisition module further includes one or more resource adapters for connecting to the one or more data sources, the resource adapted being a system-level software driver to connect the one or more data sources.

7. A system in accordance with claim 3, wherein the data acquisition module further includes one or more extraction programs to read data from the one or more data sources.

8. A system in accordance with claim 3, wherein the data acquisition module further includes an exchange infrastructure for message-based exchange between the one or more data sources and the BI platform.

9. A system in accordance with claim 1, wherein the mapping is automatic.

10. A system in accordance with claim 1, wherein the mapping is manual.

11. A system in accordance with claim 4, wherein the BI platform further comprises a persistency memory for storing one or more tables representing the OLAP analysis.

12. A system in accordance with claim 1, wherein the unified UI is generated by a web application.

13. A system in accordance with claim 1, wherein the unified UI is generated by a desktop application.

14. A system in accordance with claim 1, wherein the unified view module does not include information identifying sources of data in the common meta model data set such that a mapping of the data is not visible to a user of the common meta model data set.

15. A computer-implemented architecture for integrating online transactional processing (OLTP) systems with online analytical processing (OLAP) system, the architecture comprising:
    a plurality of computing systems each including at least one programmable processor, each of the programmable processors systems executing one or more computer programs, the programmable processors being coupled to receive data and instructions from, and to transmit data and instructions to, at least one storage system, at least one input device, and at least one output device, the computing systems providing:
    a data access layer including one or more data access programs for accessing OLTP data from an OLTP data source;
    a service layer including a business intelligence (BI) platform for generating OLAP data, and a resource adapter direct mapping tool for transforming data from the OLTP data source to a first data set in accordance with a common meta-model without processing the OLTP data by an OLAP engine or the BI platform, the BI platform providing persistency and comprising an OLAP engine;
    a unified view module being part of a data abstraction layer that provides the common meta-model for OLTP data of the first data set integrated with OLAP data, the data abstraction layer providing a description of the meta-model and a result set of the data, interfaces to retrieve and interact with the data, and a description of functionality available with data sources; and a user interface presentation layer to provide a user interface for displaying a report run on the integrated OLTP and OLAP data, the user interface presentation layer comprising a user interface (UI) tool set for creating a unified UI for displaying reports that are run on the multidimensional database and common meta model data set in a same report, the unified UI to build reports from the common meta model data set;

the architecture including first, second, and third data flow integration paths, the first integration path comprising the OLTP data and the resource adapter direct mapping tool and having a first service quality, and the second and third integration paths comprising the BI platform and having a second service quality being different from the first service quality, the first service qualities being dependent on the services used by the first integration path, the second service qualities being dependent on the services used by the second integration path, and wherein the first and second service qualities are at least different in that the second service quality comprises at least some overhead of the BI platform that is not included in the first service quality, the second integration path using the OLAP engine in the BI platform, data accessed by the third integration path storing data using the persistency of the BI platform; the third integration path using the OLAP engine in the BI platform, data accessed by the third integration path not using the persistency of the BI platform to store data.

16. An architecture in accordance with claim 15, wherein the common meta-model is organized into a unified business query view for display in the user interface.

17. An architecture in accordance with claim 15, wherein the user interface presentation layer includes a design time module for generating the user interface, the design time module using the meta-model provided by the data abstraction layer to allow reports to be built upon the meta-model.

18. An architecture in accordance with claim 17, wherein the user interface presentation layer includes a runtime module having an application for displaying the user interface, the runtime module obtaining data and service quality descriptions from the data abstraction layer and layout information from the design time module, wherein a user interface abstraction layer within the runtime module provides a common command and layout description interface for both web and desktop-based user interface presentations.

19. An architecture in accordance with claim 18, wherein the application is a web application.

20. An architecture in accordance with claim 18, wherein the application is a desktop application.

21. A system comprising:
a plurality of computing systems each including at least one programmable processor, each of the programmable processors systems executing one or more computer programs, the programmable processors being coupled to receive data and instructions from, and to transmit data and instructions to, at least one storage system, at least one input device, and at least one output device, the computing systems providing:

one or more data sources providing OLTP data;

one or more data acquisition modules to access, in a data access layer, the OLTP data from the one or more data sources;

an exchange infrastructure in the data access layer for process integration based on an exchange of standard messages according to predefined business process scenarios;

a business intelligence (BI) platform having a multidimensional database providing OLAP data, the BI platform providing persistency, an OLAP engine, generic BI services, and business warehouse metadata, the BI platform being in a service layer;

a resource adapter direct mapping tool to transform the OLTP data of the data sources not being processed by an OLAP engine or the BI platform to a first data set in accordance with a common meta model of a unified view module, the BI platform being in the service layer;

the unified view module being part of a data abstraction layer, the unified view module integrating the first data set of the OLTP data with the multidimensional data of the multidimensional database to produce a common meta model data set, the data abstraction layer providing data manipulation services that enable interaction on data independent from, and in addition to, data manipulation services by the service layer or the data sources; and a user interface (UI) tool set for creating a unified UI for displaying reports that are run on the multidimensional database and common meta model data set, the unified UI to build reports from the common meta model data set;

the system including at least first and second data flow integration paths originating at the data sources and passing through the data access layer, the service layer, and the data abstraction layer, at least one data flow integration paths passing through the BI platform and at least one data flow integration paths bypassing the BI platform.

22. A system as in claim 21, wherein: the first integration path comprises the BI platform and has a first service quality, and a third integration path comprises the BI platform and has a second service quality being different from the first service quality, the first service qualities being dependent on the services used by the first integration path in the BI platform, the second service qualities being dependent on the services used by the third integration path in the BI platform, and wherein the first and second service qualities are at least different in that the second service quality comprises at least some overhead of a persistency layer in the BI platform that is not included in the first service quality, the persistency layer in the BI platform storing data in structures optimized for reporting purpose.

* * * * *